(12) United States Patent
Liao

(10) Patent No.: US 8,832,944 B2
(45) Date of Patent: Sep. 16, 2014

(54) ELECTRIC HAIR CUTTER AND CONTROL METHOD FOR MOTOR ROTATIONAL SPEED THEREOF

(76) Inventor: Yen-Fu Liao, New Taipei (TW)

(*) Notice: Subject to any disclaimer, the term of this patent is extended or adjusted under 35 U.S.C. 154(b) by 417 days.

(21) Appl. No.: 13/288,914

(22) Filed: Nov. 3, 2011

(65) Prior Publication Data

US 2013/0111765 A1 May 9, 2013

(51) Int. Cl.
| | | |
|---|---|---|
| *B26B 19/28* | (2006.01) | |
| *H02P 6/06* | (2006.01) | |
| *H02J 1/10* | (2006.01) | |
| *H02P 6/18* | (2006.01) | |
| *H02P 6/08* | (2006.01) | |

(52) U.S. Cl.
CPC ... *H02J 1/10* (2013.01); *H02P 6/06* (2013.01); *H02P 6/182* (2013.01); *H02P 6/08* (2013.01)
USPC ............... 30/210; 318/400.01; 318/400.15

(58) Field of Classification Search
USPC ............ 30/43.1–46, 194–210; 318/400.01, 318/400.07, 400.15, 430, 432, 434
See application file for complete search history.

(56) References Cited

U.S. PATENT DOCUMENTS

| | | | | |
|---|---|---|---|---|
| 3,678,358 A | * | 7/1972 | Kolatorowicz | 318/400.22 |
| 4,386,298 A | * | 5/1983 | Toshimitu | 318/400.09 |
| 4,543,718 A | * | 10/1985 | Duescher | 30/124 |
| 4,680,515 A | * | 7/1987 | Crook | 318/400.04 |
| 4,922,169 A | * | 5/1990 | Freeman | 318/400.1 |
| 5,223,771 A | * | 6/1993 | Chari | 318/400.09 |
| 5,640,073 A | * | 6/1997 | Ikeda et al. | 318/400.03 |
| 5,780,983 A | * | 7/1998 | Shinkawa et al. | 318/400.04 |
| 6,049,187 A | * | 4/2000 | Haner | 318/725 |
| 6,222,333 B1 | * | 4/2001 | Garnett et al. | 318/400.14 |
| 6,285,146 B1 | * | 9/2001 | Harlan | 318/400.04 |
| 6,392,372 B1 | * | 5/2002 | Mays, II | 318/400.01 |
| 6,586,898 B2 | * | 7/2003 | King et al. | 318/400.34 |
| 6,650,072 B2 | * | 11/2003 | Harlan | 318/400.2 |
| 7,109,672 B1 | * | 9/2006 | Mushika et al. | 318/400.08 |
| 7,239,098 B2 | * | 7/2007 | Masino | 318/400.35 |
| 7,248,006 B2 | * | 7/2007 | Bailey et al. | 318/400.4 |
| 7,259,531 B1 | * | 8/2007 | Liu | 318/400.38 |
| 7,262,568 B2 | * | 8/2007 | Takada | 318/400.3 |
| 7,321,210 B2 | * | 1/2008 | Wood | 318/400.28 |
| 7,386,224 B2 | * | 6/2008 | Hsieh | 388/829 |
| 7,400,103 B2 | * | 7/2008 | Hofer | 318/400.01 |
| 7,564,208 B2 | * | 7/2009 | Bailey et al. | 318/567 |
| 7,579,796 B2 | * | 8/2009 | Hofer | 318/276 |
| 7,711,439 B2 | * | 5/2010 | Frankel et al. | 700/17 |
| 8,033,022 B2 | * | 10/2011 | Ben-Ari | 30/43.4 |
| 8,054,033 B2 | * | 11/2011 | Kern et al. | 318/400.05 |

(Continued)

FOREIGN PATENT DOCUMENTS

DE 102011088687 A1 * 6/2013

*Primary Examiner* — Jason Daniel Prone
(74) *Attorney, Agent, or Firm* — Chun-Ming Shih

(57) ABSTRACT

In an electric hair cutter and a control method for its motor rotational speed, the electric hair cutter includes a main body, a BLDC (brushless DC) motor, a power source, a detecting unit, an electrical energy adjusting unit and a control module. The main body has a cutting unit. The BLDC motor drives the cutting unit. The detecting unit can detect the counter-electromotive force of the BLDC motor. The control module may receive the counter-electromotive force signals detected by the detecting unit and may control the electrical energy adjusting unit according to the counter-electromotive force signals so as to keep the BLDC motor rotating at a fixed RPM.

8 Claims, 6 Drawing Sheets

(56) References Cited

U.S. PATENT DOCUMENTS

| | | | |
|---|---|---|---|
| 8,072,166 B2* | 12/2011 | Takeuchi et al. | 318/400.17 |
| 8,100,912 B2* | 1/2012 | Marietta | 30/166.3 |
| 8,183,803 B2* | 5/2012 | Li et al. | 318/400.01 |
| 8,241,008 B2* | 8/2012 | Tsai et al. | 417/32 |
| 8,314,580 B2* | 11/2012 | Grogg et al. | 318/400.34 |
| 8,341,846 B1* | 1/2013 | Holmes | 30/43.1 |
| 8,427,084 B2* | 4/2013 | Kobayashi | 318/257 |
| 2002/0083592 A1* | 7/2002 | Liao | 30/43.92 |
| 2003/0011332 A1* | 1/2003 | Mays, II | 318/254 |
| 2003/0175017 A1* | 9/2003 | Pelonis | 388/804 |
| 2005/0206335 A1* | 9/2005 | Strike et al. | 318/439 |
| 2007/0085496 A1* | 4/2007 | Philipp et al. | 318/139 |
| 2008/0086887 A1* | 4/2008 | Park et al. | 30/29.5 |
| 2010/0064520 A1* | 3/2010 | Park et al. | 30/29.5 |
| 2011/0273117 A1* | 11/2011 | Nakamura et al. | 318/468 |
| 2012/0005904 A1* | 1/2012 | Zwirkoski et al. | 30/277.4 |
| 2012/0191250 A1* | 7/2012 | Iwata et al. | 700/275 |
| 2012/0274077 A1* | 11/2012 | Usselman et al. | 290/1 A |
| 2013/0014967 A1* | 1/2013 | Ito et al. | 173/93 |
| 2013/0126202 A1* | 5/2013 | Oomori et al. | 173/217 |
| 2013/0180118 A1* | 7/2013 | Shimizu et al. | 30/382 |
| 2013/0255981 A1* | 10/2013 | Noto et al. | 173/20 |
| 2013/0314017 A1* | 11/2013 | Sanchez et al. | 318/400.33 |
| 2014/0001993 A1* | 1/2014 | Iwata et al. | 318/400.26 |
| 2014/0070752 A1* | 3/2014 | Otsuji et al. | 318/603 |
| 2014/0088753 A1* | 3/2014 | Lim et al. | 700/168 |
| 2014/0103840 A1* | 4/2014 | Lim | 318/400.28 |

* cited by examiner

ELECTRIC HAIR CUTTER AND CONTROL METHOD FOR MOTOR ROTATIONAL SPEED THEREOF

BACKGROUND OF THE INVENTION

1. Field of the Invention

The invention generally relates to an electric hair cutter. More particularly, the invention relates to an electric hair cutter and a control method for its motor rotational speed, in which a brushless DC (BLDC) motor is used and the counter-electromotive force pulses of the motor are detected and used to calculate the motor speed so as to keep the motor rotating at a fixed speed and in which a comfortable grip is provided.

2. Descriptions of the Related Art

Electric hair cutter has been used to cut hair. The hair cutter has a cutting unit and a screen unit. The reciprocating motion of the cutting unit enables it to cut hair.

Because the cutting unit plays a crucial role in haircutting, improvements of the cutting unit (such as the use of different materials and the inclination angle of the small blades of the cutting unit) have been made.

The inventor has worked in the relevant field for 20 years. From his talks and chats with the customers and hairdressers, he found out that, aside from the improvements in the use of different materials for the cutting unit and different designs of the main body of the hair cutter, the following disadvantages have not been addressed in the prior art:

(1) Motor has a relatively shorter service life because of the wear and tear of the carbon brushes. When the motor of a hair cutter is damaged, its user often purchases another one to replace it even though other components of it are still usable. Therefore, users have to spend more money and such discarded hair cutters are not environmentally friendly.

(2) The cutting unit has a relatively shorter service life. Conventionally, because the carbon brushes are easily worn, this affects the motor speed and the motor can not rotate at a fixed speed. In addition, after a period of use, its battery can store a less amount of current; this affects the motor speed too. Therefore, these factors affect the haircutting performance of the cutting unit and the service life of the cutting unit is shortened.

(3) Unable to provide comfortable grip: Because the conventional motor rotates at lower, unstable speeds, the hair cutter of the prior art can not provide comfortable, stable grip. This would affect the haircutting performance of hairdressers.

From the above, we can see that the prior art motor for the electric hair cutter needs to be improved.

SUMMARY OF THE INVENTION

An object of the present invention is to provide an electric hair cutter and a control method for its motor rotational speed, wherein the hair cutter and its cutting unit have longer service life, its cutting unit may have a higher haircutting performance and comfortable, and stable (non-vibratory) grip may be provided.

To reach the object, an electric hair cutter and a control method for its motor rotational speed of the present invention are disclosed. The electric hair cutter of the present invention comprises a main body, a brushless DC motor, a power source, a detecting unit, an electrical energy adjusting unit and a control module. The main body has a cutting unit. The brushless DC (BLDC) motor drives the cutting unit. The power source may power up the BLDC motor. The detecting unit can detect the counter-electromotive force of the brushless DC motor. The electrical energy adjusting unit is electrically connected with the brushless DC motor and the power source and can adjust the current fed from the power source to the brushless DC motor. The control module may receive the counter-electromotive force signals detected by the detecting unit and may control the electrical energy adjusting unit according to the counter-electromotive force signals so as to keep the BLDC motor rotating at a fixed speed.

The control module comprises a memory unit and a computing unit. A pre-determined RPM value is stored in the memory unit and the computing unit can receive the counter-electromotive force signals detected by the detecting unit. The computing unit may then calculate the speed of the BLDC motor by determining the interval between two consecutive counter-electromotive force pulses and compare the calculated speed with the pre-determined RPM value stored in the memory unit.

The detecting unit may be a shunt, a comparator, a Hall sensor or a magnetoresistor.

The memory unit may be a DRAM (dynamic random access memory), an SRAM (static random access memory) or a flash memory.

The electrical energy adjusting unit is made of a plurality of BJTs or MOSFETs.

The power source is a battery or an outside electrical source.

A rotational speed control method for electric hair cutters comprising detecting the counter-electromotive force of the BLDC motor, receiving the counter-electromotive force signals detected by the detecting unit, calculating the speed of the BLDC motor and comparing the calculated speed with a pre-determined RPM value and determining whether the calculated RPM is lower than the pre-determined RPM value. A detecting unit is used to detect the counter-electromotive force of the BLDC motor. A control module can receive the counter-electromotive force signals detected by the detecting unit and calculate the speed of the BLDC motor and compare the calculated speed with a pre-determined RPM value stored in the memory unit. If the calculated speed is lower than the pre-determined RPM value, more current will be fed from the electrical energy adjusting unit to the motor to increase its speed. If the calculated RPM is more than the pre-determined RPM value, less current will be fed from the electrical energy adjusting unit to the motor to decrease its speed.

Therefore, the electric hair cutter and a control method for its motor rotational speed of the present invention have at least one of the following three advantages:

(1) The hair cutter has longer service life.
(2) The cutting unit may be kept in a sharp condition throughout its service life.
(3) The electric hair cutter has a comfortable, stable grip.

BRIEF DESCRIPTION OF THE DRAWINGS

Various other objects, features and attendant advantages of the present invention will become more fully appreciated as the same becomes better understood when considered in conjunction with the accompanying drawings, in which like reference numbers designate the same or similar parts throughout the following drawings.

DESCRIPTION OF THE PREFERRED EMBODIMENT

Figure 1:
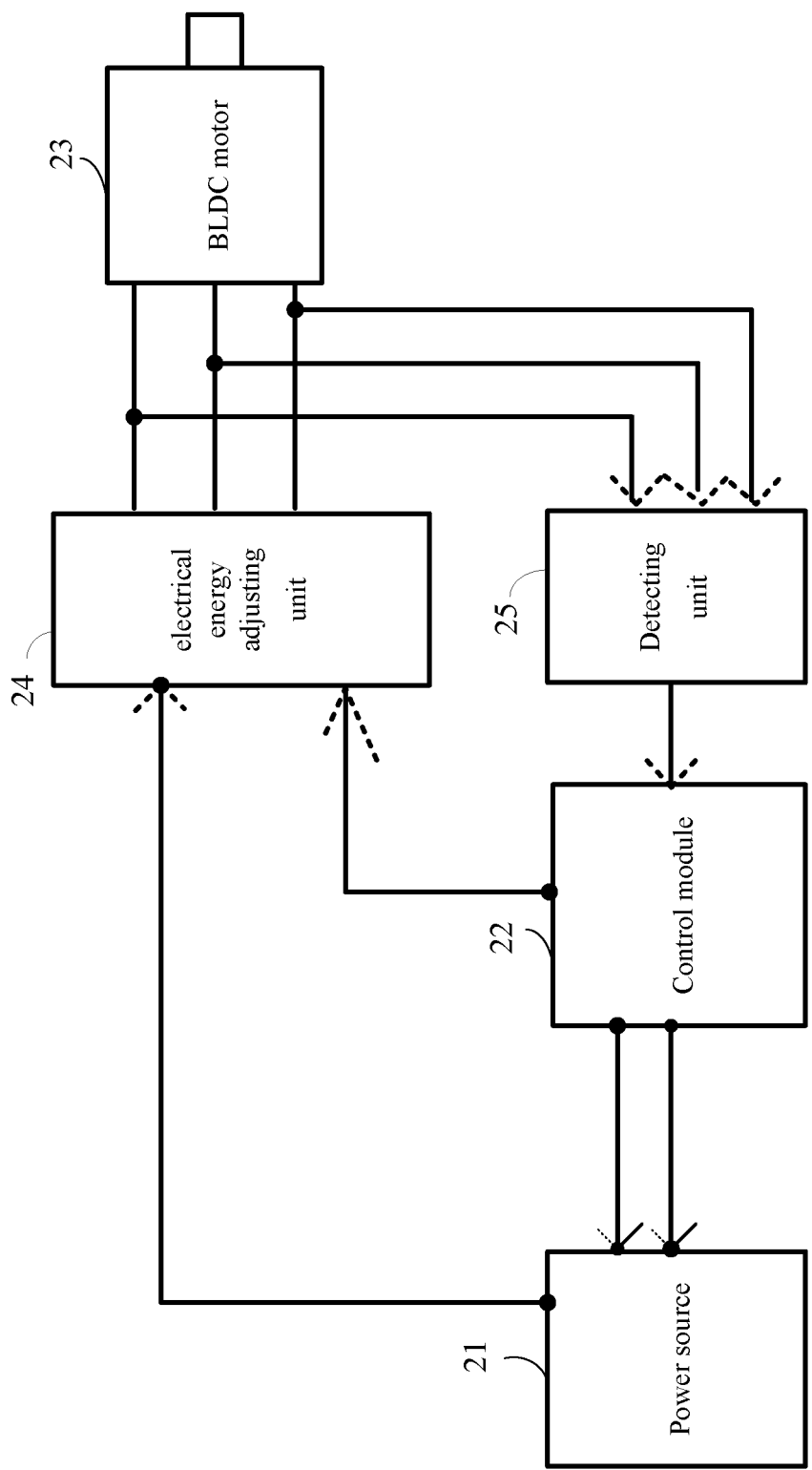
FIG. 1 is an overall block diagram of the electric hair cutter of the present invention.
Figure 2:
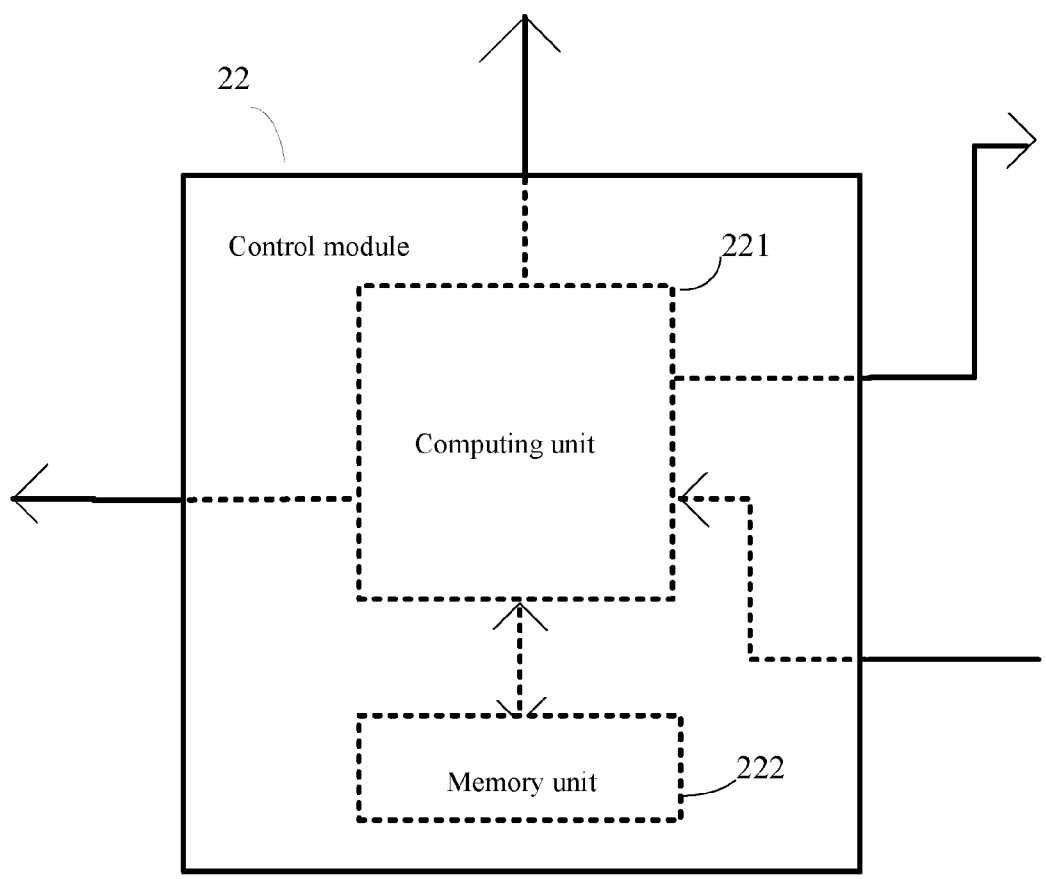
FIG. 2 is a block diagram of the control module of the electric hair cutter of the present invention.
Figure 3:
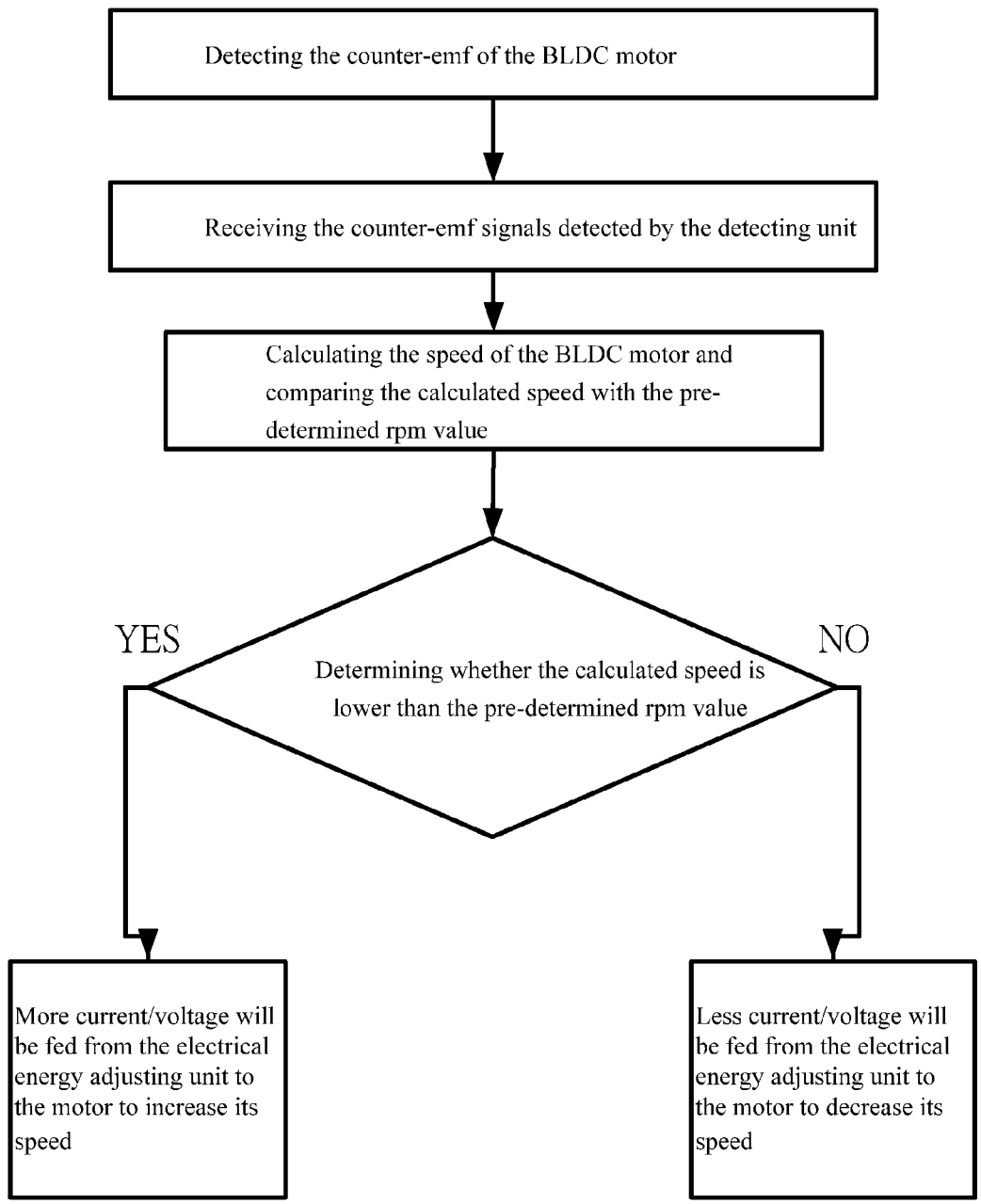
FIG. 3 is a flow chart illustrating the rotational speed control method of the electric hair cutter of the present invention.

Please refer to FIGS. 1, 2 and 3. FIG. 1 is an overall block diagram of the electric hair cutter of the present invention. FIG. 2 is a block diagram of the control module of the electric hair cutter of the present invention. FIG. 3 is a flow chart of the rotational speed control method of the electric hair cutter of the present invention. The electric hair cutter of the present invention comprises a power source 21, a control module 22, a BLDC (brushless DC) motor 23, an electrical energy adjusting unit 24 and a detecting unit 25.

The detecting unit 25 can detect the counter-electromotive force of the BLDC motor 23 and may be a magnetic field detecting element, shunt, comparator, Hall sensor or magnetoresistor. Then, the detecting unit 25 sends the counter-electromotive force signals that it detects to the computing unit 221 of the control module 22. Next, the computing unit 221 can calculate the RPM of the BLDC motor 23 by determining the interval between two consecutive counter-electromotive force pulses or the average value of the counter-electromotive force pulses. In addition, the control module 22 has a memory unit 222, which contains a pre-determined RPM value. Therefore, the computing unit 221 can compare a detected RPM value with the pre-determined RPM value. The memory unit 222 may be a flash memory or a non-volatile memory.

When the speed detected by the computing unit 221 is less than the pre-determined RPM value stored in the memory unit 222, the control module 22 sends a PWM (pulse width modulation) signal to the electrical energy adjusting unit 24. If the electrical energy adjusting unit 24 is made of a plurality of BJTs (bipolar junction transistor) or MOSFETs (metal-oxide semiconductor field effect transistor), Vdd (maximum voltage) will be increased through the base of the BJTs or the gate of the MOSFETs. Therefore, more current is fed from the electrical energy adjusting unit 24 to the BLDC motor 23. The torsion and speed of the motor 23 would continue to increase until the speed of the motor 23 is equal to the pre-determined RPM value stored in the memory unit 222.

When the speed detected by the computing unit 221 is more than the pre-determined RPM value stored in the memory unit 222, the control module 22 sends a PWM (pulse width modulation) signal to the electrical energy adjusting unit 24. If the electrical energy adjusting unit 24 is made of a plurality of BJTs (bipolar junction transistor) or MOSFETs (metal-oxide semiconductor field effect transistor), Vdd (maximum voltage) will be decreased through the base of the BJTs or the gate of the MOSFETs. Therefore, less current/voltage is fed from the electrical energy adjusting unit 24 to the motor 23. The torsion and RPM of the motor 23 would continue to decrease until the RPM of the motor 23 is equal to the pre-determined RPM value stored in the memory unit 222.

Figure 4:
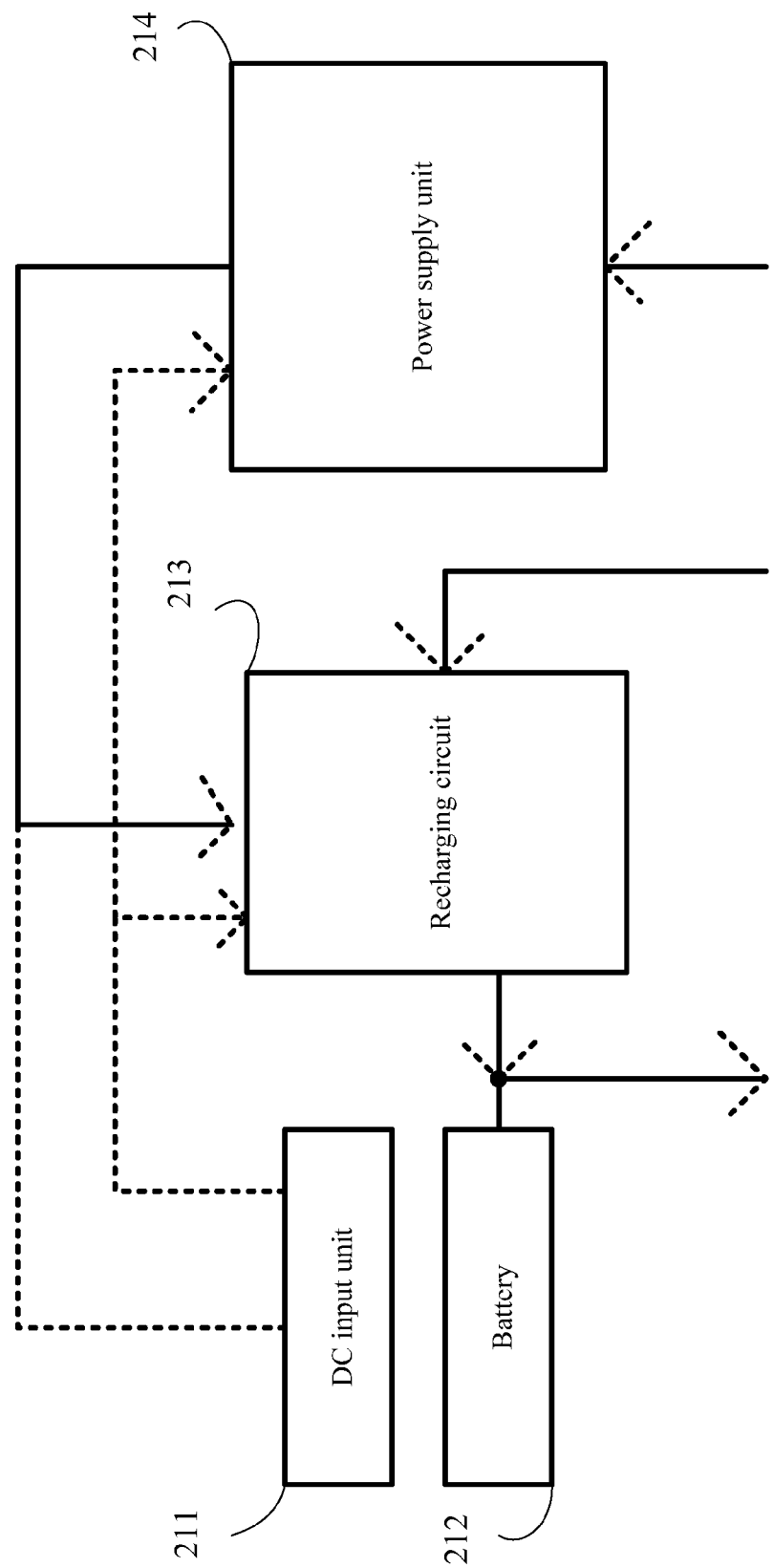
FIG. 4 is a block diagram of the power source module of the electric hair cutter of the present invention.

Please refer to FIGS. 1 and 4. FIG. 4 is a block diagram of the power source module of the electric hair cutter of the present invention. Power may be supplied to a power supply unit 214 from a DC input unit 211 or a battery 212. Then, the power supply unit 214 would supply power to the relevant components. In addition, the DC input unit 211 may charge up the battery 212 through a recharging circuit 213.

Figure 5:
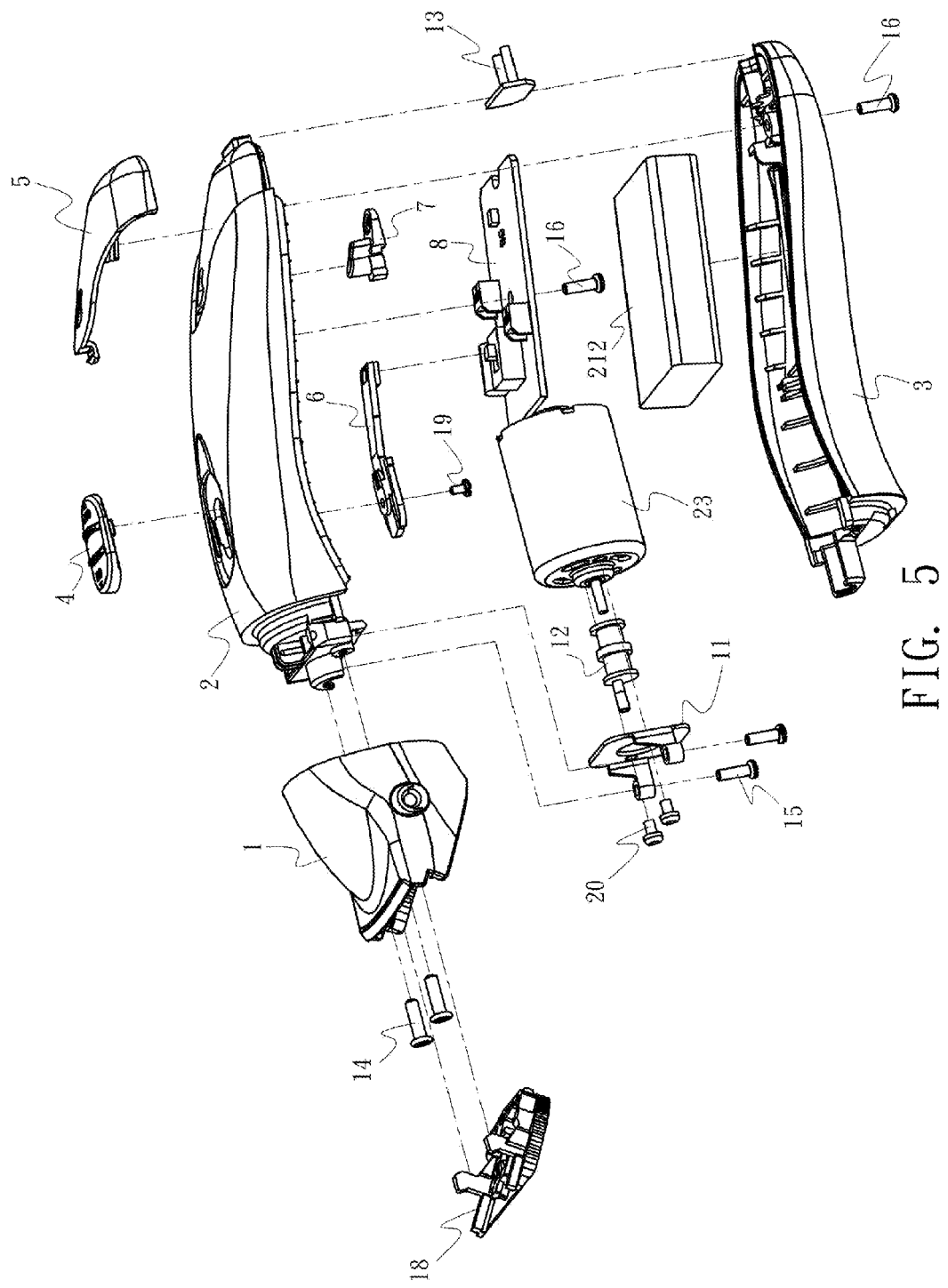
FIG. 5 is an exploded view of the electric hair cutter of the present invention.
Figure 6:
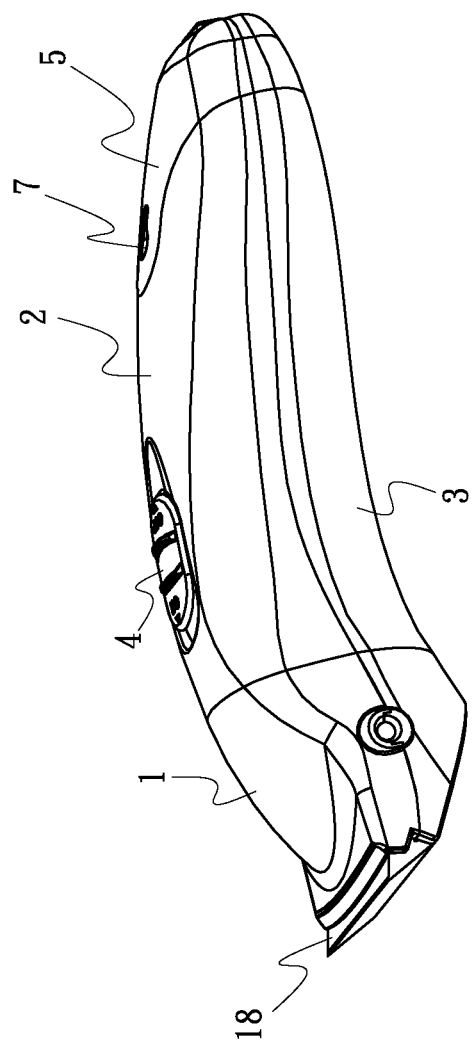
FIG. 6 is a perspective view of the electric hair cutter of the present invention in an assembled condition.

Now, please refer to FIGS. 5 and 6. FIG. 5 is an exploded view of the electric hair cutter of the present invention. FIG. 6 is a perspective view of the electric hair cutter of the present invention in an assembled condition. The electric hair cutter includes an upper casing 2 and a lower casing 3. These two casings 2 and 3 form a housing to hold the other components of the electric hair cutter. A front casing 1 is fitted to the frontal ends of the two casings to house a cutting unit 18.

The cutting unit 18 is driven by the brushless DC motor 23, which is disposed in the space formed by the upper casing 2 and lower casing 3. Power is fed from the motor 23 to the cutting unit 18 through a transmission axle 12. A battery 212 powers up the BLDC motor 23.

Therefore, the motor 23 can provide high speed, stable motion to enable the cutting unit 18 to cut hair.

Now, we will describe the structure of the electric hair cutter of the present invention in detail. The motor 23 and the battery 212 are controlled by a circuit board 8, which is fitted to the inner side of the upper casing 2 through a bolt 16. The circuit board 8 is controlled by a switch 4, which extends through and protrudes from the upper casing 2. In use, a user can use the switch 4 to turn on the hair cutter. In addition, the switch 4 is connected with a connective portion 6. The circuit board 8 also has an LED 7, which protrudes from the upper casing 2 and acts as an indicator light. The circuit board 8 is connected with an electric plug 13, which may be inserted into an outside power source (maybe an electrical socket), so that power may be fed to the circuit board 8 or be used to recharge the battery 212. A bolt 16 is used to connect the upper casing 2 with the lower casing 3.

Two bolts 20 are used to connect the motor 23 with a motor positioning board unit 11; another two bolts 15 are used to connect the motor positioning board unit 11 with the upper casing 2. Another two bolts 14 are used to connect the front casing 1 with the housing formed by the two casings 2 and 3. The cutting unit 18 is fitted to the front casing 1 in a snap-on manner. A decorative portion 5 may be fitted to the lower portion of the upper casing 2 for the purpose of comfortable grip or decoration.

Therefore, the electric hair cutter may be assembled and disassembled easily. If a user wants to disassemble it, first he may disengage the cutting unit 18 from the front casing 1 and then detach the cutting unit 18 from the front casing 1. Then, he may undo the two bolts 14 to detach the front casing 1 from the upper casing 2. Next, he may undo the two bolts 16 to detach the upper casing 2 from the lower casing 3. Now, he may inspect and repair the components inside the main body.

Although a preferred embodiment of the present invention has been described in detail hereinabove, it should be understood that the preferred embodiment is to be regarded in an illustrative manner rather than a restrictive manner, and all variations and modifications of the basic inventive concepts herein taught still fall within the scope of the present invention.

From the above, we can see that the electric hair cutter and a control method for its motor's rotational speed of the present invention meet the relevant patent requirements. It is hoped that the patent application will be approved.

What is claimed is:
1. An electric hair cutter, comprising:
a main body, having a cutting unit;
a brushless DC (BLDC) motor, which drives the cutting unit;
a power source, which provides electricity to the BLDC motor;
a detecting unit, which detects counter-electromotive force signals of the BLDC motor;

an electrical energy adjusting unit, which is electrically connected with the BLDC motor and the power source and adjusts current fed from the power source to the BLDC motor; and a control module, which receives counter-electromotive force signals detected by the detecting unit and controls the electrical energy adjusting unit according to the counter-electromotive force signals so as to keep the BLDC motor rotating at a fixed RPM.

2. The electric hair cutter as in claim 1, wherein the control module comprises a memory unit and a computing unit, and wherein a pre-determined RPM value is stored in the memory unit and the computing unit receives the counter-electromotive force signals detected by the detecting unit, and wherein the computing unit then calculates RPM of the BLDC motor by determining an interval between two consecutive counter-electromotive force signals and compares the calculated RPM with the pre-determined RPM value stored in the memory unit.

3. The electric hair cutter as in claim 2, wherein the memory unit may be a DRAM (dynamic random access memory), an SRAM (static random access memory) or a flash memory.

4. The electric hair cutter as in claim 1, wherein the detecting unit may be a shunt, a comparator, a Hall sensor or a magnetoresistor.

5. The electric hair cutter as in claim 1, wherein the electrical energy adjusting unit is made of a plurality of BJTs or MOSFET's MOSFETs.

6. The electric hair cutter as in claim 1, wherein the power source is a battery.

7. The electric hair cutter as in claim 1, wherein the power source is an outside electrical source.

8. A rotational speed control method for the electric hair cutter of claim 1, comprising:
   detecting the counter-electromotive force signals of the BLDC motor;
   receiving the counter-electromotive force signals detected by the detecting unit;
   calculating RPM of the BLDC motor to obtain a calculated RPM, and comparing the calculated RPM with a pre-determined RPM value; and
   determining whether the calculated RPM is lower than the pre-determined RPM value,
   if the calculated RPM is lower than the pre-determined RPM value, more current/voltage is fed from the electrical energy adjusting unit to the BLDC motor to increase speed, and if the calculated RPM is more than the pre-determined RPM value, less current/voltage is fed from the electrical energy adjusting unit to the motor to decrease the speed.

\* \* \* \* \*